S. H. Barnes.
Corset.

№ 3624 Reissued Aug. 31, 1869.

Witnesses.

J. N. Bloomington

Wm Treuin

Inventor.

S. H. Barnes

Per Munn & Co

Attorneys

UNITED STATES PATENT OFFICE.

FRANCES LEE BARNES, OF NEW YORK, N. Y., ADMINISTRATRIX OF THE ESTATE OF SAMUEL H. BARNES, DECEASED.

IMPROVEMENT IN CORSET-SPRINGS.

Specification forming part of Letters Patent No. 56,345, dated July 17, 1866; Reissue No. 2,929, dated May 12, 1868; Reissue No. 3,520, dated June 29, 1869; Reissue No. 3,624, dated August 31, 1869.

*To all whom it may concern:*

Be it known that SAMUEL H. BARNES, deceased, of the city, county, and State of New York, during his life-time did invent a new and Improved Corset-Spring; and I, FRANCES LEE BARNES, of the city, county, and State of New York, administratrix of the estate of the said SAMUEL H. BARNES, deceased, do hereby declare that the following is a full, clear, and exact description thereof, which will enable others skilled in the art to make and use the same.

The present invention consists in forming the springs of corsets of two or more metallic plates placed one upon another and fastened together at their center, but so connected at or near each end that they can play or move upon each other in the direction of their length as the springs are bent, whereby their flexibility and elasticity are greatly increased, while at the same time much strength is obtained and the springs rendered much more durable than the springs for corsets now in general use, as will be obvious from the following detail description thereof, reference being had to the accompanying drawings, in which—

Figure 1:
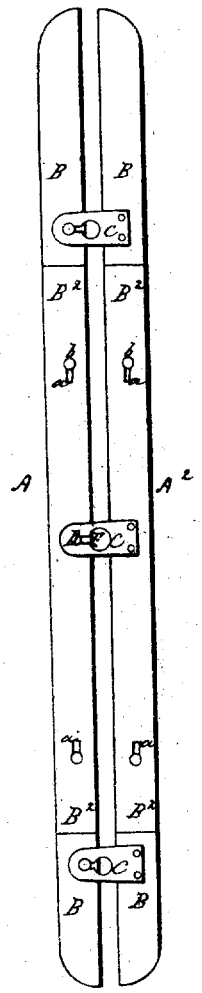
Figure 2:
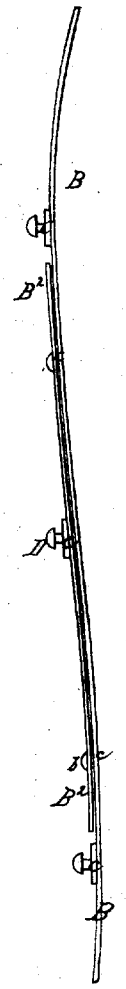

Figure 1 is a view of the two springs of the corset, having the ordinary clasps for fastening the corset about the waist of the person who is to wear it. Fig. 2 is an edge view of the same.

Similar letters of reference indicate corresponding parts.

A $A^2$ in the drawings represent two springs of a corset properly bent in the direction of their length, to conform to the body or waist of a person, each of which springs in the present instance is composed of two metallic plates, B $B^2$, placed one upon the other, (the one, B, a little longer than the other, $B^2$,) and there secured at their center, or midway between their two ends, in the case A by the rivets which secure the ordinary corset-clasp, C, to the same, and in the other case, $A^2$, by the headed rivet D, on which the clasp C is interlocked by its eye E. At or near each end of the short plate $B^2$ of the two springs A $A^2$ are short slots *a*, extending in the direction of their length, through which project the rounded ends or heads *b* of fixed pins *c* in the longer or under plate, B, by means of which slots, as the corset-springs are bent, the plates constituting the same can play or move, the one upon the other, the heads of the pins *c* preventing them from becoming disengaged, or, in other words, springing apart from each other or sliding off laterally.

From the above description it is plain to be seen, by forming the corset-springs of two plates, (one or more may be used, if desired, laid one upon the other, but so connected together that the several plates constituting such plates can freely play upon each other in the direction of their length,) that the flexibility, pliability, or elasticity of the springs is much increased without in the least degree impairing their strength, rendering them much more durable and serviceable than the ordinary corset-springs now in general use—an advantage and result of the utmost importance and utility.

Although the springs have been hereinabove explained as formed of two metallic plates laid one upon the other and secured together as described, three or more may be used; but two are sufficient for ordinary corsets, it being distinctly understood that this invention is not limited to any particular number of plates which may be employed to form the springs, whether one or more, it simply consisting in so securing the several plates constituting the springs to each other that they can freely move or play upon each other.

It may be stated that the terms "corset-steel," "corset-spring," and "corset-clasp" are each and all employed by the trade to designate a pair of springs, steels, or stiffeners connected by suitable clasps, whereby they are not only adapted to stiffen the front of the corset, but to fasten the two edges of the same together.

Having thus described the invention, what I claim as new, and desire to secure by Letters Patent, is—

1. A pair or set of corset-springs, each spring consisting of two or more metallic plates placed one upon another and fastened together at their centers, but so connected at or near each end that they can play or move upon each other in the direction of their length and be prevented from sliding off each other laterally.

2. A pair or set of corset-springs, each spring composed of two or more metallic plates placed one above another and fastened together at their centers, and so connected at or near each end that they can move or play upon each other in the direction of their length.

3. A pair or set of corset-springs, each spring consisting of two or more metallic plates placed one upon another and fastened together at their centers, but so connected at or near each end that they can play or move upon each other in the direction of their length and be prevented from sliding off each other laterally, the clasps by which the springs are combined, except the center one, being attached to only one of the plates.

The above reissue specification of the invention of SAML. H. BARNES, deceased, signed by me this 7th day of August, 1869.

FRANCES L. BARNES.

Witnesses:

GEO. W. MABEE,

JAMES T. GRAHAM.